US012323776B2

(12) United States Patent
Tian et al.

(10) Patent No.: US 12,323,776 B2
(45) Date of Patent: Jun. 3, 2025

(54) AUDIO OUTPUT DEVICE, METHOD FOR ELIMINATING SOUND LEAKAGE, AND STORAGE MEDIUM

(71) Applicant: RDA MICROELECTRONICS (SHANGHAI) CO., LTD., Shanghai (CN)

(72) Inventors: Wenqiang Tian, Shanghai (CN); Jiayi Zhuang, Shanghai (CN); Qinghua Yu, Shanghai (CN); Long Wang, Shanghai (CN)

(73) Assignee: RDA MICROELECTRONICS (SHANGHAI) CO., LTD., Shanghai (CN)

( * ) Notice: Subject to any disclaimer, the term of this patent is extended or adjusted under 35 U.S.C. 154(b) by 276 days.

(21) Appl. No.: 17/912,668

(22) PCT Filed: Apr. 30, 2020

(86) PCT No.: PCT/CN2020/088333
§ 371 (c)(1),
(2) Date: Sep. 19, 2022

(87) PCT Pub. No.: WO2021/184501
PCT Pub. Date: Sep. 23, 2021

(65) Prior Publication Data
US 2023/0171539 A1 Jun. 1, 2023

(30) Foreign Application Priority Data
Mar. 19, 2020 (CN) ........................ 202010185649.0

(51) Int. Cl.
*H04R 3/00* (2006.01)

(52) U.S. Cl.
CPC ........... *H04R 3/00* (2013.01); *H04R 2430/00* (2013.01)

(58) Field of Classification Search
CPC ....... G10K 11/17857; G10K 11/17854; G10K 11/17881; G10K 2210/1081;
(Continued)

(56) References Cited

U.S. PATENT DOCUMENTS

2007/0010283 A1* 1/2007 Kim .................... H04M 1/6016 455/550.1
2012/0195447 A1 8/2012 Hiruma et al.
(Continued)

FOREIGN PATENT DOCUMENTS

CN 1909566 A 2/2007
CN 106101350 A 11/2016
(Continued)

OTHER PUBLICATIONS

WIPO, International Search Report and Written Opinion for International Application No. PCT/CN2020/088333, Dec. 23, 2020.

*Primary Examiner* — Lun-See Lao
(74) *Attorney, Agent, or Firm* — Raj S. Davé; Davé Law Group, LLC

(57) ABSTRACT

An audio output device, a method for eliminating sound leakage, and a storage medium are provided in the disclosure. The audio output device includes a processor, a first speaker, and a second speaker. The processor is configured to generate a second audio file based on a first audio file and a parameter adjustment value. The processor is configured to control the first speaker to play the first audio file to generate a first audio and synchronously control the second speaker to play the second audio file to generate a second audio. The first audio is transmitted to an ear of a user for the user to listen, and the second audio is used to eliminate an audio leaked to an outside of the audio output device during transmission of the first audio to the ear of the user.

17 Claims, 2 Drawing Sheets

(58) Field of Classification Search

CPC ........... G10K 11/175; G10K 11/17815; G10K 11/17817; G10K 11/17823; G10K 11/1783; G10K 11/17885; G10K 2210/12; G10K 2210/129; G10K 2210/3056; G10K 11/17825; G10K 11/17833; G10K 11/17855; G10K 11/17873; G10K 15/02; G10K 2210/10; G10K 2210/3216; H04R 5/02; H04R 1/2842; H04R 2430/01; H04R 2499/11; H04R 3/12; H04R 1/2849; H04R 1/403; H04R 1/406; H04R 2201/401; H04R 29/002; H04R 1/1041; H04R 2430/00; H04R 2460/01; H04R 3/00; H04R 3/02; H04S 7/303; H04S 2420/01; H04S 7/308; H04S 3/02; H04S 7/30; H03F 3/3091; H03F 3/3096; H04B 1/20; H04B 1/54; H04B 3/23; H04B 3/234; H04M 1/035; H04W 84/02

USPC ............................... 381/1–3, 312, 74, 56–58

See application file for complete search history.

(56) References Cited

U.S. PATENT DOCUMENTS

| | | | | | |
|---|---|---|---|---|---|
| 2015/0071453 | A1* | 3/2015 | Po | G10K 11/17817 381/71.11 |
| 2021/0014596 | A1* | 1/2021 | Sun | H04L 65/60 |

FOREIGN PATENT DOCUMENTS

| | | | |
|---|---|---|---|
| CN | 106210236 | A | 12/2016 |
| CN | 209562784 | U | 10/2019 |

* cited by examiner

AUDIO OUTPUT DEVICE, METHOD FOR ELIMINATING SOUND LEAKAGE, AND STORAGE MEDIUM

CROSS REFERENCE TO RELATED APPLICATION(S)

This application is a National Stage of International Application No. PCT/CN2020/088333, field on Apr. 30, 2020, which claims priority to Chinese Patent Application No. 202010185649.0, filed on Mar. 19, 2020, both of which are incorporated by reference herein.

TECHNICAL FIELD

This disclosure relates to an audio output device, in particular to an audio output device, a method for eliminating sound leakage, and a storage medium.

BACKGROUND

When talking with mobile phones or earphones, it is undesirable for the voice of the other party to leak out and be heard by the people around. When listening to music or watching videos, there should be no sound leakage, to avoid affecting other people around. When talking, listening to music, or watching videos with current audio system products, including earphones and mobile phones, the sound leakage often occurs. For example, if the volume of the bone conduction headset or the headphone is high, the sound leakage occurs. For a full-screen mobile phone, due to the small space left for the earpiece, the earpiece will be tilted upward, resulting in obvious sound leakage. There is no similar technology to solve the problem of the sound leakage.

SUMMARY

In a first aspect, an audio output device is provided in the disclosure. The audio output device includes a processor, a first speaker, and a second speaker. The processor is electrically coupled with the first speaker and the second speaker. The processor is configured to generate a second audio file based on a first audio file and a parameter adjustment value. The processor is configured to control the first speaker to play the first audio file to generate a first audio and synchronously control the second speaker to play the second audio file to generate a second audio. The first audio is transmitted to a user for the user to listen, and the second audio is used to eliminate an audio leaked to an outside of the audio output device during transmission of the first audio to the user.

In a second aspect, a method for eliminating sound leakage is provided in the disclosure. The method is applied to an audio output device. The method includes: controlling a first speaker of the audio output device to play a first audio file to generate a first audio, where the first audio is transmitted to a user for the user to listen; generating a second audio file based on the first audio file and a parameter adjustment value; and synchronously controlling a second speaker to play the second audio file to generate a second audio, where the second audio is used to eliminate an audio leaked to an outside of the audio output device during transmission of the first audio to the user.

In a third aspect, a non-transitory computer readable storage medium is provided. The non-transitory computer readable storage medium stores computer programs. When executed by an audio output device, the computer programs cause the audio output device to perform the method of the first aspect.

BRIEF DESCRIPTION OF THE DRAWINGS

To illustrate technical solutions of embodiments of the disclosure more clearly, the following briefly introduces accompanying drawings used in implementations. Obviously, the drawings in the following description are some implementations of the disclosure. For those of ordinary skill in the art, other drawings can also be obtained from these drawings without creative effort.

DETAILED DESCRIPTION

To make those skilled in the art better understand solutions of the disclosure, the technical solutions in embodiments of the disclosure will be described clearly and completely hereinafter with reference to accompanying drawings in the embodiments of the disclosure. Apparently, the described embodiments are merely some rather than all embodiments of the disclosure. All other embodiments obtained by those of ordinary skill in the art based on the embodiments of the disclosure without creative efforts shall fall within the protection scope of the disclosure.

The terms "first", "second", and the like used in the specification, the claims, and the accompany drawings of the disclosure are used for distinguishing between different objects rather than describing a particular order. The terms "include" and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" referred to herein means that a particular feature, structure, or feature described in connection with the embodiment may be contained in at least one embodiment of the disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

The audio output devices involved in the embodiments of the disclosure may include speakers, earphones, and various handheld devices, vehicle-mounted devices, wearable devices, and the like with audio output functions. For the convenience of description, the devices mentioned above are collectively referred to as audio output devices.

Figure 1:
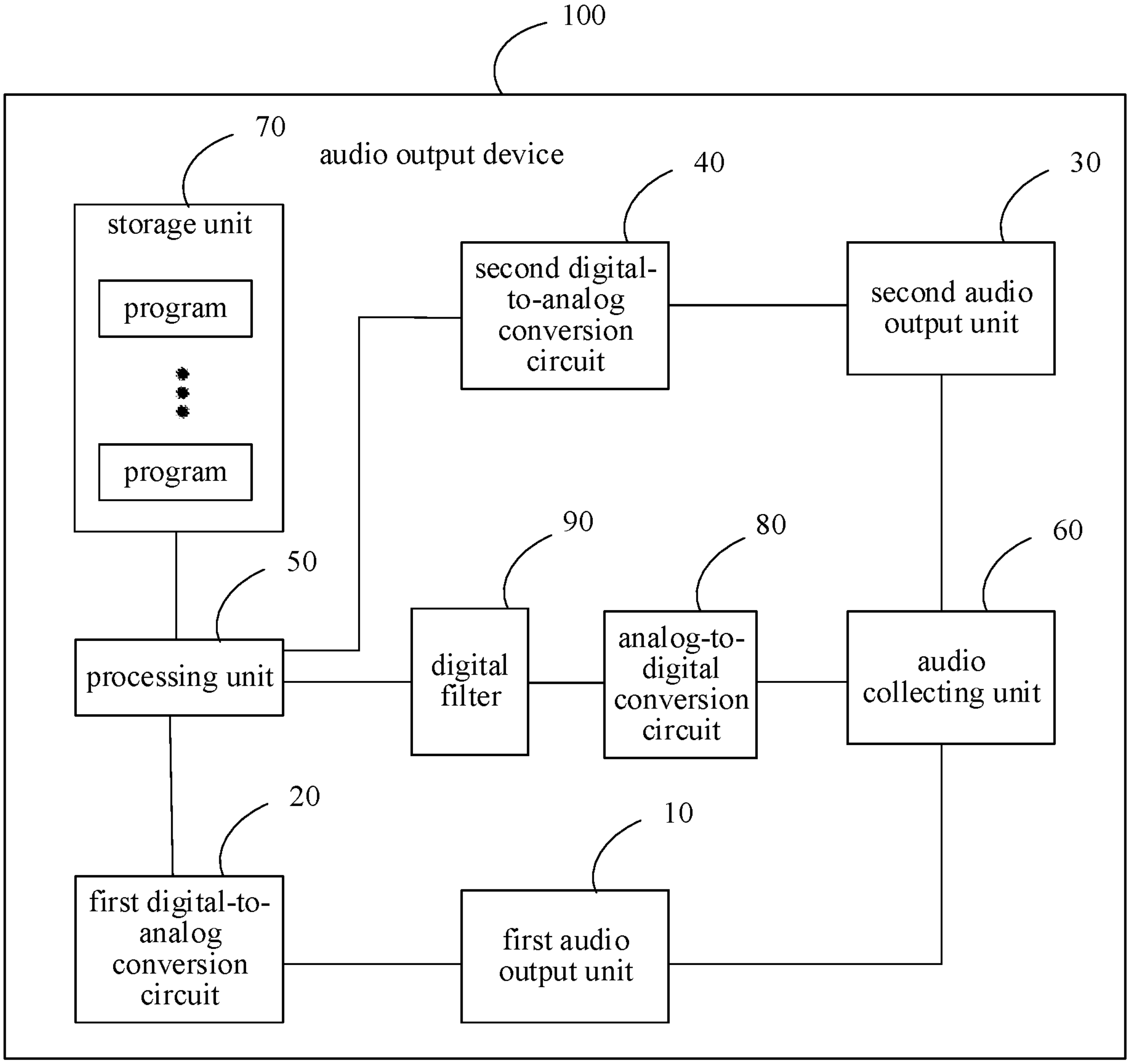
FIG. 1 is a schematic diagram of modules of an audio output device in embodiments of the disclosure.

Referring to FIG. 1, FIG. 1 is a schematic diagram of modules of an audio output device 100 in embodiments of the disclosure. The audio output device 100 includes a first audio output unit 10, a second audio output unit 30, and a processing unit 50. The processing unit 50 is coupled with the first audio output unit 10 and the second audio output unit 30. The processing unit 50 is configured to control the first audio output unit 10 to play a first audio file to generate a first audio. The processing unit 50 is configured to generate a second audio file based on the first audio file and a parameter adjustment value, and synchronously control the second audio output unit 30 to play the second audio file to generate a second audio. The first audio is transmitted to an ear of a user for the user to listen, and the second audio is used to eliminate an audio leaked to an outside of the audio output device 100 during transmission of the first audio to the ear of the user.

For the audio output device 100 and the method for eliminating sound leakage provided in the disclosure, the second audio is adopted to eliminate the audio of the first audio leaked to the outside of the audio output device 100, eliminating sound leakage.

In some embodiments, the first audio output unit 10 is disposed opposite to the second audio output unit 30. It can be understood that, in other embodiments, the first audio output unit 10 and the second audio output unit 30 may also have other positional relationships, which are not limited herein.

In some embodiments, the first audio output unit 10 and the second audio output unit 30 may be, but is not limited to, sound generating units such as speakers. When in use, the first audio output unit 10 faces the ear of the user, for transmitting the first audio to the ear of the user for the user to listen; the second audio output unit 30 faces away from the ear of the user, for generating the second audio to silence the audio leaked to the outside of the audio output device 100 during transmission of the first audio to the ear of the user. Thus, sound leakage can be eliminated.

Furthermore, in some embodiments, the processing unit 50 determines the audio leaked to the outside of the audio output device 100 based on the first audio file and a playback parameter(s) of the first audio file, determines the parameter adjustment value based on the first audio and the audio leaked to the outside of the audio output device 100, and generates the second audio file based on the first audio file and the parameter adjustment value.

Furthermore, in some embodiments, the processing unit 50 determines a spectrum curve of the audio leaked to the outside of the audio output device 100 based on the first audio file and the playback parameter of the first audio file, determines the parameter adjustment value based on a spectrum curve of the first audio and the spectrum curve of the audio leaked to the outside of the audio output device 100, and generates the second audio file based on the first audio file and the parameter adjustment value. The spectrum curve is a curve with frequency as the horizontal axis and amplitude and phase as the vertical axis.

Furthermore, in some embodiments, since the audio output device 100 is not completely fit the ear of the user, a part of the first audio may leak to the outside of the audio output device 100 during transmission of the first audio to the ear of the user. Furthermore, the greater the loudness of the first audio is, the greater the loudness of the audio of the first audio leaked to the outside of the audio output device 100, but the loudness of the audio leaked to the outside of the audio output device 100 is always smaller than the loudness of the first audio. Therefore, the audio output device 100 pre-stores a correspondence table, and the correspondence table contains a correspondence among first audio files, playback parameters thereof, and parameter adjustment values. It can be understood that, the correspondence may be set based on a correspondence between first audio files as well as playback parameters thereof and parameter adjustment values in a previous record. The correspondence may also be set based on the parameter(s) of the audio that may leak when the first audio file is played with the playback parameter, where the parameter is estimated based on the structure, material, and other properties of the audio output device 100.

It can be understood that, in some embodiments, the first audio file may be, but is not limited to, stored in a storage unit 70 of the audio output device 100. The first audio file may be an audio file sent by an external device to the audio output device 100 and stored in the storage unit 70 thereof, or an audio file stored locally in the storage unit 70.

It can be understood that, in some embodiments, the first audio file may be divided into several audio segments, for example, based on the playing order, the audio segments are the first segment, the second segment, . . . , the N-th segment in sequence. Accordingly, the second audio file may also be divided into several audio segments, for example, based on the playing order, the audio segments are the first segment, the second segment, . . . , the N-th segment in sequence. The audio segments of the first audio file are in one-to-one correspondence with the audio segments of the second audio file. That is, the first segment of the first audio file corresponds to the first segment of the second audio file, and so on, the N-th segment of the first audio file corresponds to the N-th segment of the second audio file.

It can be understood that, in some embodiments, the first audio may include, but is not limited to, three parameters of period, phase, and amplitude. The second audio may include, but is not limited to, three parameters of period, phase, and amplitude.

It can be understood that, in some embodiments, an amplitude and period of the audio leaked to the outside of the audio output device during transmission of the first audio to the ear of the user are the same as an amplitude and period of the second audio; a phase of the audio leaked to the outside of the audio output device during transmission of the first audio to the ear of the user is opposite to a phase of the second audio.

It can be understood that, in some embodiments, the parameter adjustment value includes one or more of an amplitude adjustment value and a phase adjustment value.

Furthermore, in some embodiments, the audio output device 100 further includes a first digital-to-analog conversion circuit 20. The first digital-to-analog conversion circuit 20 is between the processing unit 50 and the first audio output unit 10. The first digital-to-analog conversion circuit 20 is configured to perform digital-to-analog conversion on the first audio file to convert the first audio file into an analog signal suitable for the first audio output unit 10.

Furthermore, in some embodiments, the audio output device 100 further includes a second digital-to-analog conversion circuit 40. The second digital-to-analog conversion circuit 40 is between the processing unit 50 and the second audio output unit 30. The second digital-to-analog conversion circuit 40 is configured to convert the second audio into an analog signal suitable for the second audio output unit 30.

Furthermore, in some embodiments, the audio output device 100 further includes an audio collecting unit 60. The audio collecting unit 60 is configured to pick up the second audio and the audio of the first audio leaked to the outside of the audio output device 100 when the first audio output unit 10 plays a first segment of the first audio file. The processing unit 50 is configured to adjust and update the parameter adjustment value based on the second audio and the audio of the first audio leaked to the outside of the audio output device 100, to control the second audio output unit 30 to generate an updated second audio file by updating all segments subsequent to a segment corresponding to the first segment in the second audio file based on the updated parameter adjustment value and the first audio file, and to synchronously control the second audio output unit 30 to play a corresponding segment of the updated second audio file to generate an updated second audio when controlling the first audio output unit 10 to play a subsequent segment of the first audio file to generate the first audio. The updated second audio is used to eliminate the audio of the first audio leaked to the outside of the audio output device.

Furthermore, in some embodiments, the audio collecting unit 60 may be, but is not limited to, a unit for audio collecting such as a microphone.

The audio output device 100 further includes an analog-to-digital conversion circuit 80, and the analog-to-digital conversion circuit 80 is disposed between the processing unit 50 and the audio collecting unit 60. The analog-to-digital conversion circuit 80 is configured to convert the collected audio from an analog signal into a digital signal suitable for processing of the processing unit 50.

Furthermore, in some embodiments, the audio output device 100 further includes a digital filter 90 disposed between the analog-to-digital conversion circuit 80 and the processing unit 50. The digital filter 90 is configured to filter the digital signal generated by the analog-to-digital conversion circuit 80, and transmit the filtered digital signal to the processing unit 50 for processing.

Furthermore, in some embodiments, after the second audio file is updated, when the processing unit 50 controls the first audio output unit 10 to continue playing the subsequent segment of the first audio file to generate the first audio, the processing unit 50 synchronously controls the second audio output unit 30 to play the corresponding segment of the updated second audio file to generate the second audio. The second audio is configured to eliminate the audio of the first audio leaked to the outside of the device, to avoid sound leakage. In this process, the audio collecting unit 60 continues picking up the second audio and the audio of the first audio leaked to the outside of the audio output device 100, and the parameter adjustment value is updated again. This is repeated until the updated second audio can completely silence the audio of the first audio leaked to the outside of the device.

Therefore, in the disclosure, the second audio can be updated in real time based on the audio of the first audio leaked to the outside of the audio output device 100, so that the second audio can eliminate the audio of the first audio leaked to the outside of the audio output device 100 at every moment, achieving good effect of eliminating the sound leakage.

It can be understood that, alternatively, the audio collecting unit 60 is configured to pick up a residual audio of the first audio that is leaked to the outside of the audio output device 100 and is not eliminated by the second audio. The processing unit 50 is configured to adjust the parameter adjustment value based on the residual audio, to generate an updated second audio file by updating all segments subsequent to a segment corresponding to the first segment in the second audio file based on the updated parameter adjustment value and the first audio file, and to synchronously control the second audio output unit 30 to play a corresponding segment of the updated second audio file to generate an updated second audio when controlling the first audio output unit 10 to play a subsequent segment of the first audio file to generate the first audio. The updated second audio is used to eliminate the audio of the first audio leaked to the outside of the audio output device.

Furthermore, in some embodiments, after the second audio file is updated, when the processing unit 50 controls the first audio output unit 10 to continue playing the subsequent segment of the first audio file to generate the first audio, the processing unit 50 synchronously controls the second audio output unit 30 to play the corresponding segment of the updated second audio file to generate the second audio. The second audio is configured to eliminate the audio of the first audio leaked to the outside of the device, to avoid sound leakage. In this process, the audio collecting unit 60 continues picking up the residual audio of the first audio that is leaked to the outside of the audio output device 100 and is not eliminated by the second audio, and the processing unit 50 is configured to update the parameter adjustment value based on the residual audio. This is repeated until the audio of the first audio leaked to the outside of the device after being eliminated with the updated second audio is within the error range.

Figure 2:
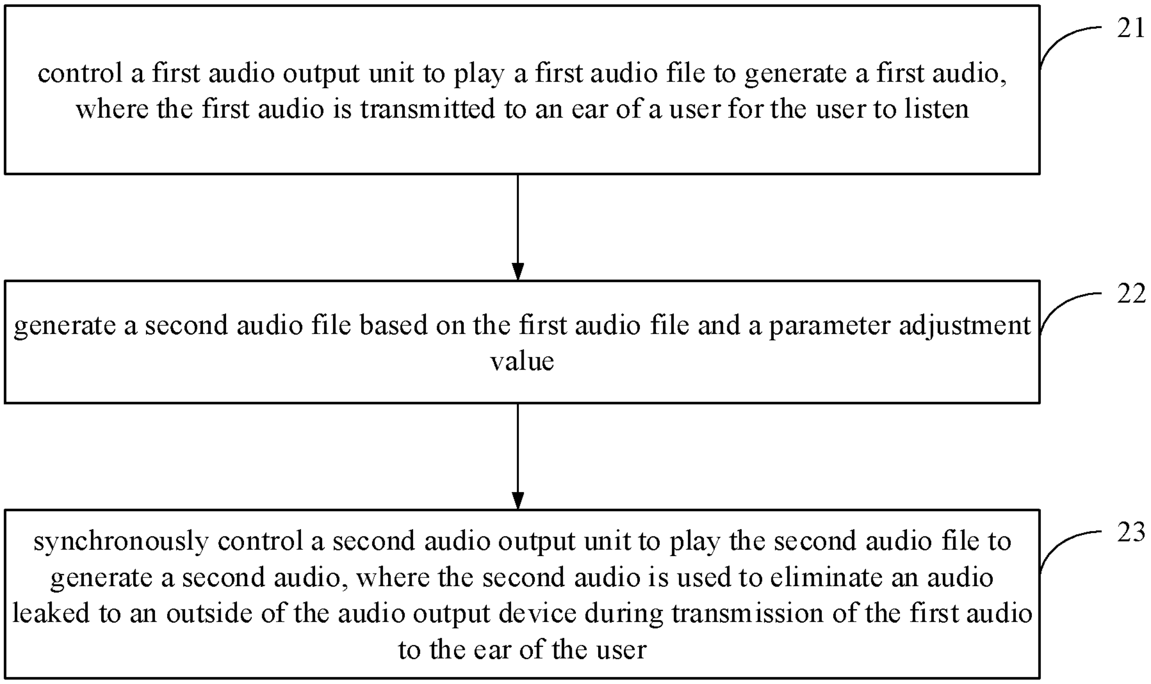
FIG. 2 is a schematic flow chart of a method for eliminating sound leakage in embodiments of the disclosure.

Referring to FIG. 2, FIG. 2 is a schematic flow chart of a method for eliminating sound leakage in embodiments of the disclosure. The method is applied to the audio output device 100 to eliminate the sound leakage of the audio output device 100. The method includes the following.

21: control a first audio output unit 10 to play a first audio file to generate a first audio, where the first audio is transmitted to an ear of a user for the user to listen.

22: generate a second audio file based on the first audio file and a parameter adjustment value.

23: synchronously control a second audio output unit 30 to play the second audio file to generate a second audio, where the second audio output unit 30 is disposed opposite to the first audio output unit 10 and the second audio is used to eliminate an audio leaked to an outside of the audio output device 100 during transmission of the first audio to the ear of the user.

Furthermore, in some embodiments, generating the second audio file based on the first audio file and the parameter adjustment value includes the following.

Determine the parameter adjustment value based on the first audio and an audio leaked to an outside of the audio output device 100.

Generate the second audio file based on the first audio file and the parameter adjustment value.

Furthermore, in some embodiments, generating the second audio file based on the first audio file and the parameter adjustment value includes the following.

Determine the parameter adjustment value based on a spectrum curve of the first audio and a spectrum curve of the audio leaked to the outside of the audio output device 100.

Generate the second audio file based on the first audio file and the parameter adjustment value. The spectrum curve is a curve with frequency as the horizontal axis and amplitude and phase as the vertical axis.

It can be understood that, in some embodiments, the first audio file may be divided into several audio segments, for example, based on the playing order, the audio segments are the first segment, the second segment, . . . , the N-th segment in sequence. Accordingly, the second audio file may also be divided into several audio segments, for example, based on the playing order, the audio segments are the first segment, the second segment, . . . , the N-th segment in sequence. The audio segments of the first audio file are in one-to-one correspondence with the audio segments of the second audio file. That is, the first segment of the first audio file corresponds to the first segment of the second audio file, and so on, the N-th segment of the first audio file corresponds to the N-th segment of the second audio file.

It can be understood that, in some embodiments, the first audio may include, but is not limited to, three parameters of period, phase, and amplitude. The second audio may include, but is not limited to, three parameters of period, phase, and amplitude.

It can be understood that, in some embodiments, an amplitude and period of the audio leaked to the outside of the audio output device during transmission of the first audio to the ear of the user are the same as an amplitude and period of the second audio; a phase of the audio leaked to the outside of the audio output device during transmission of the first audio to the ear of the user is opposite to a phase of the second audio.

It can be understood that, in some embodiments, the parameter adjustment value includes one or more of an amplitude adjustment value and a phase adjustment value.

Furthermore, in some embodiments, controlling the first audio output unit 10 to play the first audio file to generate the first audio includes the following.

Perform digital-to-analog conversion on the first audio file to convert the first audio file into an analog signal suitable for the first audio output unit 10.

Control the first audio output unit 10 to output the analog signal to generate the first audio.

Furthermore, in some embodiments, controlling the second audio output unit 30 to play the second audio file to generate the second audio includes the following.

Convert the second audio into an analog signal suitable for the second audio output unit 30.

Control the second audio output unit 30 to output the analog signal to generate the second audio.

Furthermore, in some embodiments, the method further includes the following.

Pick up the second audio and the audio of the first audio leaked to the outside of the audio output device 100 when the first audio output unit 10 plays a first segment of the first audio file.

Adjust and update the parameter adjustment value based on the second audio and the audio of the first audio leaked to the outside of the audio output device 100.

Control the second audio output unit 30 to update all segments subsequent to a segment corresponding to the first segment in the second audio file based on the updated parameter adjustment value and the first audio file, to generate an updated second audio file.

Synchronously control the second audio output unit 30 to play a corresponding segment of the updated second audio file to generate an updated second audio when controlling the first audio output unit 10 to play a subsequent segment of the first audio file to generate the first audio. The updated second audio is used to eliminate the audio of the first audio leaked to the outside of the audio output device.

Furthermore, in some embodiments, the method further includes the following.

Determine whether the second audio and the audio of the first audio leaked to the outside of the audio output device 100 are able to be mutually canceled.

If the two are able to be mutually canceled, skip adjusting and updating the parameter adjustment value.

If the two are not able to be mutually canceled, adjust and update the parameter adjustment value.

“Mutual canceling” refers to that a loudness of a residual audio after eliminating the audio of the first audio leaked to the outside of the audio output device 100 with the second audio is smaller than a preset threshold, which can be ignored.

Furthermore, in some embodiments, the method further includes the following.

Convert the collected audio from an analog signal to a digital signal suitable for processing of the processing unit 50.

Adjust and update the parameter adjustment value according to the digital signal.

Furthermore, in some embodiments, between converting the collected audio from the analog signal to the digital signal suitable for processing of the processing unit 50 and adjusting and updating the parameter adjustment value according to the digital signal, the method further includes the following. Filter the digital signal.

Therefore, in the disclosure, the second audio can be updated in real time based on the audio of the first audio leaked to the outside of the audio output device 100, so that the second audio can eliminate the audio of the first audio leaked to the outside of the audio output device 100 at every moment, achieving good effect of eliminating the sound leakage.

It can be understood that, alternatively, the method further includes the following.

Pick up a residual audio of the first audio that is leaked to the outside of the audio output device 100 and is not eliminated by the second audio.

Adjust the parameter adjustment value based on the residual audio.

Update all segments subsequent to a segment corresponding to the first segment in the second audio file based on the updated parameter adjustment value and the first audio file, to generate an updated second audio file.

Synchronously control the second audio output unit 30 to play a corresponding segment of the updated second audio file to generate an updated second audio when controlling the first audio output unit 10 to play a subsequent segment of the first audio file to generate the first audio. The updated second audio is used to eliminate the audio of the first audio leaked to the outside of the audio output device.

Furthermore, in some embodiments, the method further includes the following.

Determine whether a loudness of the residual audio is greater than a preset threshold.

If the loudness of the residual audio is less than the preset threshold, skip adjusting and updating the second audio file.

If the loudness of the residual audio is greater than or equal to the preset threshold, adjust and update the second audio file.

For the audio output device and the method for eliminating sound leakage provided in the disclosure, the second audio output from the second audio output unit can be adopted to eliminate the audio leaked to the outside of the audio output device by the first audio output unit, eliminating sound leakage.

Embodiments of the disclosure further provide a computer storage medium. The computer storage medium is used to store computer programs. The computer programs cause an audio output device to execute part or all of operations of the method for eliminating sound leakage as described in any of the above method embodiments.

Embodiments the disclosure further provide a computer program product. The computer program product includes a non-transitory computer readable storage medium on which computer programs are stored. The computer programs are operable to cause a computer to perform part or all of operations of the method for eliminating sound leakage as described in any of the above method embodiments.

It is to be noted that, for the sake of simplicity, the foregoing method embodiments are described as a series of action combinations, however, it will be appreciated by those skilled in the art that the disclosure is not limited by the sequence of actions described. Based on the disclosure, certain steps or operations may be performed in other order or simultaneously. Besides, it will be appreciated by those skilled in the art that the embodiments described in the specification are exemplary embodiments and the actions and modules involved are not necessarily essential to the disclosure.

In the foregoing embodiments, the description of each implementation has its own emphasis. For the parts not described in detail in one implementation, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual embodiments, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication connection among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected based on actual needs to achieve the purpose of the solutions of the embodiments.

In addition, the processing unit 50 may be, but is not limited to, a central processing unit (CPU), a general-purpose processor, a digital signal processor (DSP), an application specific integrated circuit (ASIC), a field programmable gate array (FPGA), or other programmable logic devices, discrete gates or transistor logic devices, discrete hardware components.

The functional units in various embodiments of the disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the disclosure. The above memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the embodiments described above may be accomplished by means of a program to instruct associated hardware, the program may be stored in a computer readable storage, which may include a flash memory, a ROM, a RAM, disk or CD, and so on.

The embodiments of the disclosure are described in detail above. Some examples are used herein to illustrate the principle and implementations of the disclosure. The description of the above embodiments is only used to understand the method and core idea of the disclosure. Meanwhile, for those of ordinary skill in the art, based on the idea of the disclosure, there will be changes in the implementation and application scope. In summary, contents of this specification should not be construed as a limitation on the disclosure.

What is claimed is:

1. An audio output device, comprising a processor, a first speaker, and a second speaker, wherein the processor is electrically coupled with the first speaker and the second speaker respectively;

the processor is configured to generate a second audio file based on a first audio file and a parameter adjustment value; and the processor is configured to control the first speaker to play the first audio file to generate a first audio and synchronously control the second speaker to play the second audio file to generate a second audio, wherein the first audio is transmitted to a user for the user to listen, and the second audio is used to eliminate an audio leaked to an outside of the audio output device during transmission of the first audio to the user;

wherein the processor is configured to: determine the audio that will leak to the outside of the audio output device based on the first audio file and a playback parameter of the first audio file, determine the parameter adjustment value based on the first audio and the audio leaked to the outside of the audio output device, and generate the second audio file based on the first audio file and the parameter adjustment value.

2. The audio output device of claim 1, wherein the first speaker is disposed opposite to the second speaker.

3. The audio output device of claim 1, wherein the second audio file varies synchronously with the first audio file, and a phase of the second audio file is opposite to a phase at a corresponding position of the first audio file.

4. The audio output device of claim 3, further comprising a microphone, wherein the microphone is configured to pick up the second audio and the audio of the first audio leaked to the outside of the audio output device when the first speaker outputs a first segment of the first audio file, wherein the processor is configured to adjust and update the parameter adjustment value based on the second audio and the audio of the first audio leaked to the outside of the audio output device, to generate an updated second audio file by updating all segments subsequent to a segment corresponding to the first segment in the second audio file based on the updated parameter adjustment value and the first audio file, and to synchronously control the second speaker to play the updated second audio file to generate an updated second audio when controlling the first speaker to play a second segment and subsequent segments after the first segment of the first audio file to generate the first audio, wherein the updated second audio is used to eliminate the audio of the first audio leaked to the outside of the audio output device.

5. The audio output device of claim 3, further comprising a microphone, wherein the microphone is configured to pick up a residual audio of the first audio that is leaked to the outside of the audio output device and is not eliminated by the second audio when the first speaker outputs a first segment of the first audio file, wherein the processor is configured to adjust the parameter adjustment value based on the residual audio, to generate an updated second audio file by updating all segments subsequent to a segment corresponding to the first segment in the second audio file based on the updated parameter adjustment value and the first audio file, and to synchronously control the second speaker to play the updated second audio file to generate an updated second audio when controlling the first speaker to play a second segment and subsequent segments after the first segment of the first audio file to generate the first audio, wherein the updated second audio is used to eliminate the audio of the first audio leaked to the outside of the audio output device.

6. A method for eliminating sound leakage, applicable to an audio output device and comprising:

controlling a first speaker of the audio output device to play a first audio file to generate a first audio, wherein the first audio is transmitted to a user for the user to listen;

generating a second audio file based on the first audio file and a parameter adjustment value; and synchronously controlling a second speaker of the audio output device to play the second audio file to generate a second audio, wherein the second audio is used to eliminate an audio leaked to an outside of the audio output device during transmission of the first audio to the user;

wherein generating the second audio file based on the first audio file and the parameter adjustment value comprises:

determining the audio that will leak to the outside of the audio output device based on the first audio file and a playback parameter of the first audio file;

determining the parameter adjustment value based on the first audio and the audio leaked to the outside of the audio output device; and generating the second audio file based on the first audio file and the parameter adjustment value.

7. The method of claim 6, wherein the second audio file varies synchronously with the first audio file, and a phase of the second audio file is opposite to a phase at a corresponding position of the first audio file.

8. The method of claim 7, further comprising:

picking up the second audio and the audio of the first audio leaked to the outside of the audio output device when the first speaker outputs a first segment of the first audio file;

updating the parameter adjustment value based on the second audio and the audio of the first audio leaked to the outside of the audio output device;

generating an updated second audio file by updating all segments subsequent to a segment corresponding to the first segment in the second audio file based on the updated parameter adjustment value and the first audio file; and synchronously controlling the second speaker to play the updated second audio file to generate an updated second audio when controlling the first speaker to play a second segment and subsequent segments after the first segment of the first audio file to generate the first audio, wherein the updated second audio is used to eliminate the audio of the first audio leaked to the outside of the audio output device.

9. The method of claim 8, wherein subsequent to picking up the second audio and the audio of the first audio leaked to the outside of the audio output device, the method further comprises:

determining whether the second audio and the audio of the first audio leaked to the outside of the audio output device are able to be mutually canceled; and adjusting and updating the parameter adjustment value based on a determination that the second audio and the audio of the first audio leaked to the outside of the audio output device are not able to be mutually canceled.

10. The method of claim 7, further comprising:

picking up a residual audio of the first audio that is leaked to the outside of the audio output device and is not eliminated by the second audio when the first speaker outputs a first segment of the first audio file;

adjusting the parameter adjustment value based on the residual audio;

generating an updated second audio file by updating all segments subsequent to a segment corresponding to the first segment in the second audio file based on the updated parameter adjustment value and the first audio file; and synchronously controlling the second speaker to play the updated second audio file to generate an updated second audio when controlling the first speaker to play a second segment and subsequent segments after the first segment of the first audio file to generate the first audio, wherein the updated second audio is used to eliminate audio of the first audio leaked to the outside of the audio output device.

11. The method of claim 10, further comprising:

determining whether a loudness of the residual audio is greater than a preset threshold; and adjusting and updating the parameter adjustment value based on a determination that the loudness of the residual audio is greater than or equal to the preset threshold.

12. A non-transitory computer readable storage medium storing computer programs, wherein when executed by an audio output device, the computer programs cause the audio output device to:

control a first speaker of the audio output device to play a first audio file to generate a first audio, wherein the first audio is transmitted to a user for the user to listen;

generate a second audio file based on the first audio file and a parameter adjustment value; and synchronously control a second speaker of the audio output device to play the second audio file to generate a second audio, wherein the second audio is used to eliminate an audio leaked to an outside of the audio output device during transmission of the first audio to the user;

wherein the computer programs causing the audio output device to generate the second audio file based on the first audio file and the parameter adjustment value cause the audio output device to:

determine the audio that will leak to the outside of the audio output device based on the first audio file and a playback parameter of the first audio file;

determine the parameter adjustment value based on the first audio and the audio leaked to the outside of the audio output device; and generate the second audio file based on the first audio file and the parameter adjustment value.

13. The non-transitory computer readable storage medium of claim 12, wherein the second audio file varies synchronously with the first audio file, and a phase of the second audio file is opposite to a phase at a corresponding position of the first audio file.

14. The non-transitory computer readable storage medium of claim 13, wherein the computer programs further cause the audio output device to:

pick up the second audio and the audio of the first audio leaked to the outside of the audio output device when the first speaker outputs a first segment of the first audio file;

update the parameter adjustment value based on the second audio and the audio of the first audio leaked to the outside of the audio output device;

generate an updated second audio file by updating all segments subsequent to a segment corresponding to the first segment in the second audio file based on the updated parameter adjustment value and the first audio file; and synchronously control the second speaker to play the updated second audio file to generate an updated second audio when controlling the first speaker to play a second segment and subsequent segments after the first segment of the first audio file to generate the first audio, wherein the updated second audio is used to eliminate the audio of the first audio leaked to the outside of the audio output device.

15. The non-transitory computer readable storage medium of claim 14, wherein the computer programs further cause the audio output device to:

determine whether the second audio and the audio of the first audio leaked to the outside of the audio output device are able to be mutually canceled; and adjust and update the parameter adjustment value based on a determination that the second audio and the audio of the first audio leaked to the outside of the audio output device are not able to be mutually canceled.

16. The non-transitory computer readable storage medium of claim 13, wherein the computer programs further cause the audio output device to:

pick up a residual audio of the first audio that is leaked to the outside of the audio output device and is not eliminated by the second audio when the first speaker outputs a first segment of the first audio file;

adjust the parameter adjustment value based on the residual audio;

generate an updated second audio file by updating all segments subsequent to a segment corresponding to the first segment in the second audio file based on the updated parameter adjustment value and the first audio file; and synchronously control the second speaker to play the updated second audio file to generate an updated second audio when controlling the first speaker to play a second segment and subsequent segments after the first segment of the first audio file to generate the first audio, wherein the updated second audio is used to eliminate audio of the first audio leaked to the outside of the audio output device.

17. The non-transitory computer readable storage medium of claim 16, wherein the computer programs further cause the audio output device to:

determine whether a loudness of the residual audio is greater than a preset threshold; and adjust and update the parameter adjustment value based on a determination that the loudness of the residual audio is greater than or equal to the preset threshold.

* * * * *